United States Patent
Olek et al.

(10) Patent No.: US 11,777,265 B2
(45) Date of Patent: Oct. 3, 2023

(54) SHIELDED Y-SHAPED SPLICE CONNECTOR AND HIS METHOD OF ASSEMBLY

(71) Applicant: APTIV TECHNOLOGIES LIMITED, St. Michael (BB)

(72) Inventors: Pawel Olek, Troy, MI (US); Agnieszka Styczen, Troy, MI (US); Olaf Patz, Troy, MI (US); Tomasz Slizowski, Troy, MI (US); Wojciech Lesniak, Troy, MI (US); Marcin Podolak, Troy, MI (US); Michal Kuligowski, Troy, MI (US); Marek Manterys, Troy, MI (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 26 days.

(21) Appl. No.: 17/013,363

(22) Filed: Sep. 4, 2020

(65) Prior Publication Data

US 2021/0111526 A1    Apr. 15, 2021

(30) Foreign Application Priority Data

Sep. 5, 2019 (EP) ..................................... 19195636

(51) Int. Cl.
*H01R 25/00* (2006.01)
*H01R 13/52* (2006.01)
(Continued)

(52) U.S. Cl.
CPC ....... *H01R 25/003* (2013.01); *H01R 13/5208* (2013.01); *H01R 43/002* (2013.01); *H02G 15/117* (2013.01)

(58) Field of Classification Search
CPC .. H05K 9/0098; H05K 9/0007; H05K 5/0004; H01B 7/0045; H01B 17/30; H01B 17/583; H01R 31/02; H01R 13/6592; H01R 4/20; H01R 25/003; H01R 13/5208; H01R 3/002; H02G 3/06; H02G 15/117

See application file for complete search history.

(56) References Cited

U.S. PATENT DOCUMENTS 4,721,830 A    1/1988   Dagan et al.
5,119,546 A    6/1992   Cameron et al.
(Continued)

FOREIGN PATENT DOCUMENTS

CN    1697276 A       11/2005
CN    204289994 U      4/2015
(Continued)

OTHER PUBLICATIONS

English Translation of Siemens DE 930336 (Year: 1994).*
(Continued)

*Primary Examiner* — Briggitte R. Hammond
(74) *Attorney, Agent, or Firm* — Billion & Armitage

(57) ABSTRACT

The disclosure relates to a shielded Y-shaped splice connector having a housing that includes a lower body, an upper cover, and three openings arranged to receive three cable fixing devices on the housing. The periphery of the lower body and the periphery of the upper cover are each formed of a flat surface arranged to form the contact surface of the lower body and the upper cover when the housing is assembled.

15 Claims, 2 Drawing Sheets

(51) Int. Cl.
  *H01R 43/00* (2006.01)
  *H02G 15/117* (2006.01)

(56) References Cited

U.S. PATENT DOCUMENTS

| | | | | |
|---|---|---|---|---|
| 5,306,870 | A | 4/1994 | Abat | |
| 7,753,734 | B2* | 7/2010 | Eckel | H01R 13/6593 |
| | | | | 439/607.41 |
| 8,282,401 | B2* | 10/2012 | Hensen | H01R 13/52 |
| | | | | 439/76.1 |
| 9,219,336 | B2* | 12/2015 | Starke | H01R 13/6596 |
| 9,660,434 | B2* | 5/2017 | Kett | H01R 31/02 |
| 9,936,617 | B2* | 4/2018 | Degen | H02G 15/18 |
| 9,954,320 | B1* | 4/2018 | Hassan | H02G 15/115 |
| 10,862,224 | B2* | 12/2020 | Doring | H01R 4/10 |
| 10,985,538 | B2* | 4/2021 | Perez-Lazcano | H02G 3/0481 |
| 11,011,902 | B2* | 5/2021 | Specht | H01R 4/20 |
| 2009/0060419 | A1* | 3/2009 | Lu | H02G 15/113 |
| | | | | 385/56 |
| 2011/0297442 | A1* | 12/2011 | Sulzer | F16L 5/10 |
| | | | | 174/88 R |
| 2012/0021632 | A1 | 1/2012 | Matsumoto et al. | |
| 2016/0134096 | A1 | 5/2016 | Kett et al. | |
| 2019/0319437 | A1* | 10/2019 | Chu | F16L 3/085 |
| 2020/0021063 | A1 | 1/2020 | Zhang et al. | |

FOREIGN PATENT DOCUMENTS

| | | |
|---|---|---|
| CN | 205159759 U | 4/2016 |
| CN | 105556756 A | 5/2016 |
| CN | 107069611 A | 8/2017 |
| CN | 206806628 U | 12/2017 |
| CN | 207602925 U | 7/2018 |
| CN | 207638079 U | 7/2018 |
| CN | 208862523 U | 5/2019 |
| CN | 109980431 A | 7/2019 |
| CN | 209267068 U | 8/2019 |
| DE | 9303361.3 U1 | 4/1994 |
| DE | 9303361 U1 | 4/1994 |
| DK | 200001738 A | 5/2002 |
| DK | 174438 B1 | 3/2003 |
| EP | 1059477 A2 | 12/2000 |
| JP | 284971 A | 10/1997 |
| JP | 09284971 A | 10/1997 |

OTHER PUBLICATIONS

European Search Report for EP Application No. 19195636.6, dated May 29, 2020, 16 pages.
Ananymous, "Sichtkontrolle—Wikipedia", XP055696076, Retrieved from the Internet: URL:https://de.wikipedia.org/w/index.php?title=Sichtkontrolle&oldid=188942823[retrieved on May 15, 2020], May 25, 2019.
Chinese Office Action for CN Application No. 202010919520.8, dated Nov. 3, 2021, 9 pages.
English Translation of Second Office Action for CN Application No. 202010919520.8; dated Jul. 4, 2022, 8 pages.
English Translation of first Office Action for CN Application No. 202010919520.8; dated Nov. 3, 2021, 11 pages.
First Office Action for CN Application 105556756 A; dated May 4, 2016, 17 pages.
Machine Translation of First Office Action for JPH09284971 (A).
Machine Translation of Second Office Action for CN109980431 (A), 9 pages.

* cited by examiner

SHIELDED Y-SHAPED SPLICE CONNECTOR AND HIS METHOD OF ASSEMBLY

CROSS-REFERENCE TO RELATED APPLICATION(S)

This application claims the benefit of priority to European Patent Application No. EP 19195636.6, filed Sep. 5, 2019, the entire disclosure of which is hereby incorporated herein by reference.

TECHNICAL FIELD

The disclosure relates to a Y-splice shielded connector generally comprises an housing formed with a lower body arranged to receive one end of three electrical cables and an upper cover arranged to receive three retaining springs for all three cables.

BACKGROUND

There are issues when assembling manually the different components of the connector. According to prior art, the design of the connector is not adapted to be assembled with a robot.

SUMMARY

The purpose of the disclosure is therefore to propose a connector structure compatible with automatic assembly method.

To this end, a first aspect of the disclosure concerns a shielded Y-shaped splice connector including a housing comprising a lower body and an upper cover, forming the housing for the three-cable splice, and three openings arranged to receive three cable fixing devices on the housing, wherein the periphery of the lower body and the periphery of the upper cover are each formed of a flat surface arranged to form the contact surface of the lower body and the upper cover when the housing is assembled.

According to another feature, the contact surface is arranged to ensure the tightness of the housing.

According to another feature, the openings are formed on the lower body and on the upper cover and the axis of the openings is substantially parallel to the flat surfaces.

According to another feature, either the lower body or the upper cover comprises alignment elements with the other of the lower body and the upper cover arranged to ensure contact of the surfaces.

According to another feature, the alignment elements comprise a stud projecting from either the lower body or the upper cover and a hole on the other of the lower body and the upper cover arranged to receive the stud.

According to another feature, each opening comprises a connecting element arranged to provide sealing between the cable, the upper cover and the lower body.

According to another feature, the connecting element comprises an elastic sleeve whose outer surface is in contact with the upper cover and the lower body and whose inner surface is in contact with the cable.

According to another feature, each opening comprises an anti-pulling device mounted on the outer surface of the lower body and the upper cover so as to compress the elastic sleeve.

According to another feature, the assembly of the lower body on the upper cover is carried out by tightening elements, preferably at least two screws, positioned in an area corresponding to the flat contact surfaces.

Another aspect relates to a method of mounting a shielded Y-shaped splice connector, the mounting method being wherein it comprises:
- a step of mounting cable retaining springs in the upper cover,
- a visual check stage of the presence and position of the retaining springs,
- a step of applying an adhesive to the flat surface of at least one of the lower body and the upper cover,
- a visual verification step to verify the presence of at least one of the lower body and the upper cover,
- a step of assembling the lower body on the upper cover.

According to a preferred mode, the visual inspection steps are performed via a camera.

According to a preferred mode, the step of visually checking the presence and position of the holding springs also includes a check of the condition of the flat surface of the upper cover.

According to a preferred mode, the method comprises a step of positioning the cables on the lower body.

According to an advantageous mode, the spring holder comprises impressions for positioning the springs. Preferably, the impressions are magnetized to hold the springs in place during press closing.

BRIEF DESCRIPTION OF THE DRAWINGS

Other characteristics and advantages of the present disclosure will become clearer when reading the following detailed description of a method of making the disclosure given by way of example, which is not exhaustive and is illustrated by the annexed drawings, in which.

DETAILED DESCRIPTION

Figure 1:
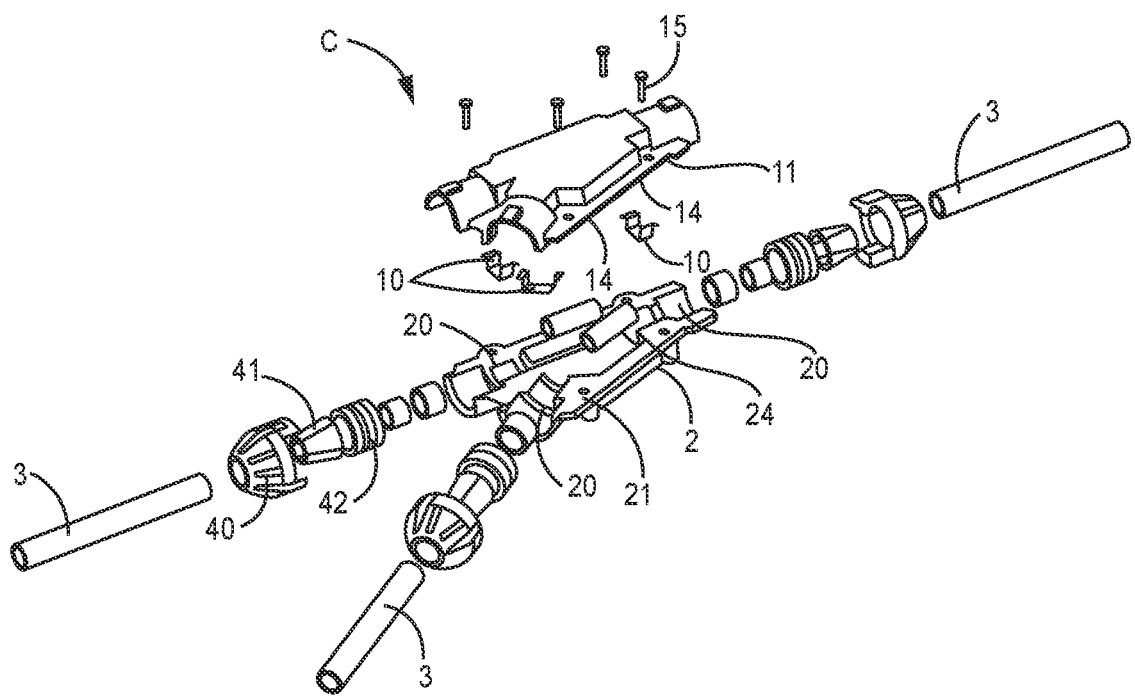
FIG. 1 represents an exploded perspective view of a shielded Y-splice connector according to the disclosure.
Figure 2:
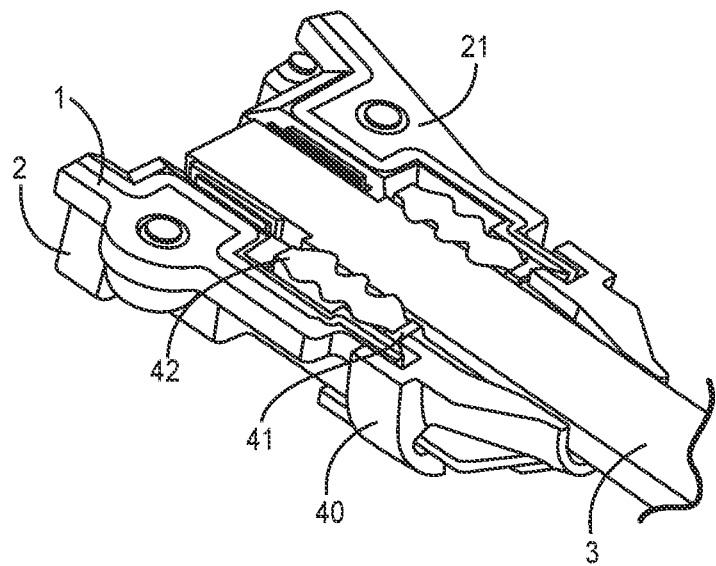
FIG. 2 represents a detail view of a shielded Y-splice connector according to the disclosure.

The disclosure will now be described with reference to FIGS. 1 to 4.

A shielded Y-splice connector includes a housing C comprising a lower body 2 and an upper cover 1 forming a housing for splicing cables 3. Housing C also includes three openings 20 arranged to receive three devices for fixing the cables 3 to housing C.

The upper cover also includes three springs 10 which also fix the cables 3 in the housing C.

The assembly of the Y-splice shielded connector includes mounting the springs 10 in the upper cover 1. The assembly of these springs 10 requires that they be stressed in the housing C.

The periphery of the lower body 2 and the upper cover 1 include a flat surface 11, 21 forming a contact surface when the housing C is assembled. In other words, when the upper cover 1 is assembled on the lower body 2, the flat surface 21 of the lower body 2 is in contact with the flat surface 11 of the upper cover 1. During assembly, an adhesive is applied to the flat surface 11, 21 of either the upper cover 1 or the main body 1 to ensure, on the one hand, the solidarization of the housing C and, on the other hand, by sealing at the contact surface between the upper cover 1 and the lower body 2. The assembly of the lower body 2 and the upper cover 1 is completed by tightening elements such as screws 15. Screws 15 are for example positioned on surfaces 11, 21 of the upper cover 1 and the main body 1. Thus, when tightening the screws 15 the sealing is reinforced.

In order to ensure optimal assembly, the upper cover 1 and lower body can be equipped with alignment elements 14, 24. These alignment elements 14, 24 allow the upper cover 1 to be correctly positioned on the lower body 2 to avoid any offset during assembly. These alignment elements include, on the one hand, studs 14, for example, projecting from the inner surface of the upper cover 1 and orifices 24 corresponding to the lower body 2. During assembly, the studs 14 must be inserted into the holes 24 so that the flat surfaces 11, 21 of the upper cover 1 and lower body 2 are perfectly adjusted.

Alternatively, the studs may be present on the lower body 2 and the holes on the upper cover 1, and the studs and holes may also be positioned near the screw holes 15.

The openings 20 of the housing C are formed on both the lower body 2 and the upper cover 1, for example, which allows the cables to be inserted during the assembly process. Thus, according to the example shown, each opening 20 is formed by a semi-circular section on the upper cover and on the lower body 1. During assembly, these semi-circular sections form a circular hole forming an opening 20.

The sealing at the opening 20 between the cable and the housing C is ensured, for example, by an elastic sleeve 42. The elastic sleeve 42 includes a central passage 43 through which the cable 3 passes. When assembling the connector according to the disclosure, sleeve 42 is slipped onto cable 3. The sleeve 42 is then placed in the circular section of the lower body 2, for example. When connecting the lower body 2 to the upper cover 1, the sleeve 42 is then compressed between the cable 3 on the one hand and the lower body 2 and the upper cover 1 on the other hand, thus ensuring sealing at the opening 20 of the housing C.

The connector also includes a cable 3 and an anti-tear device 40, 41. This anti-tear device includes a ring 41 and a cap 40 mounted on each opening 20 of the case. The ring 41 is mounted inside the opening against the elastic sleeve 42. The cap 40 is mounted outside the housing C at the opening 20. The ring 41 and the cap are also pushed onto cable 3 during assembly. When mounting the anti-tear device, the cap 40 pushes against the ring 41, which then compresses the elastic sleeve 42. This also improves the tightness at opening 20.

Figure 3:
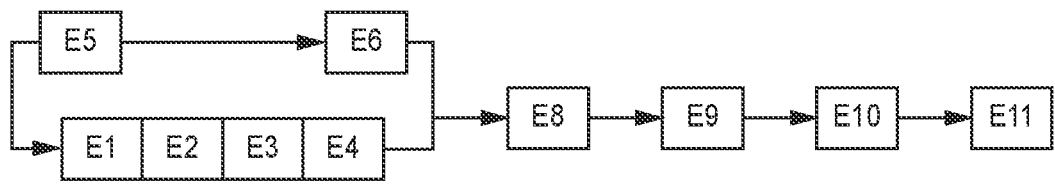
FIG. 3 represents a diagram of the process according to the disclosure.

As shown in FIG. 3, depending on the disclosure, the assembly process of the shielded Y-splice connector includes at least the following steps:
the upper cover 1 is equipped E1 with retaining springs 10,
a check E2 of the presence and position of the retaining springs is carried out before the application of an adhesive E3 on the flat surface 11 of the upper cover. This verification can be done by a camera. The adhesive can be applied alternately on the flat surface 21 of the lower cover 2.
the application of the adhesive is then checked E4, for example by means of a camera, to ensure the presence of the adhesive and the quantity of adhesive deposited on the flat surface 11, 21 of the upper cover 1 or lower body 2;
Once this check has been carried out, the upper cover 1 is assembled E8 on the lower body. This assembly can be done with screws 15.

The assembly of the upper cover 1 on the lower body 2 can be preceded by the assembly of the cables, the sleeve 42 and the anti-tear device 40, 41 on the lower body 2.

After assembly of the upper cover 1 and le lower body, the process may continue with subsequent step. As an example, a step of final assembly E9 consisting of cable assembly to the housing C. Further a final vision check E10 is done before printing or attaching an identification label E11 and a last delivery step E12 of the finished product.

In addition, the process may comprise the very first step E6 of loading the upper cover 1 and the lower body into an assembly device. In some embodiments an additional vision check could be done before the final assembly step.

Figure 4:
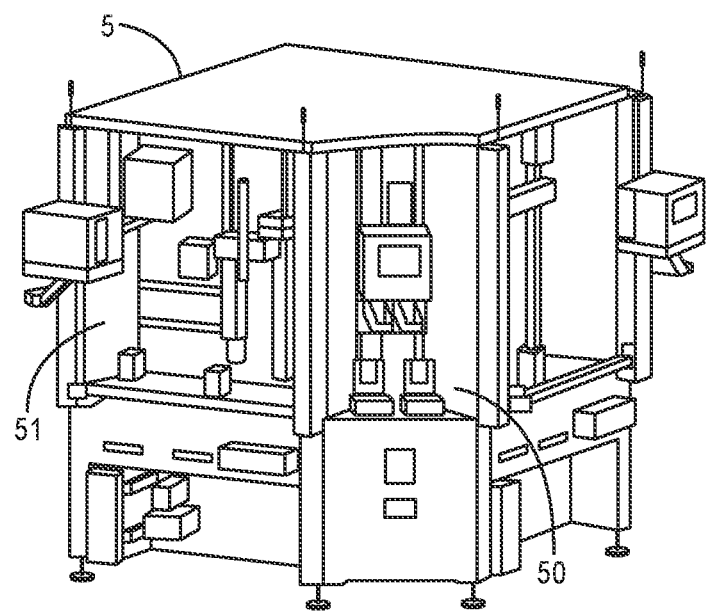
FIG. 4 represents a perspective view of an assembly device used in the process according to the disclosure.

Insofar as the connector according to the disclosure is made in 2 parts, all the steps of the process can be carried out by a automatic device 5 as represented at FIG. 4. This automatic devise 5 comprise at least a first assembly station 50 provides the user assembly tool for mounting the retain spring 10 into the upper cover 1. Another assembly station 51 comprises different support and for example six axis robot arm to guide the upper cover 1 to different positions for example:
in front of a first camera for checking presence and position of the retaining
close to a glue dispenser to apply adhesive on the flat surface of the upper cover 1;
in front of a second camera for checking presence and quantity of adhesive
over the lower body 2 in view to make the final assembly.

It will be understood that various modifications and/or improvements obvious to the skilled person may be made to the different methods of making the disclosure described in this description without going beyond the scope of the claims.

The invention claimed is:

1. A shielded Y-shaped splice connector including a housing comprising:
a lower body and an upper cover, forming the housing for the shielded Y-shaped splice,
three openings arranged to receive three anti-tear devices on the housing,
wherein each anti-tear device comprises a ring and a cap, wherein the cap is mounted on an outer surface of the lower body and upper cover, and the ring is mounted on an inner surface of the lower body and the upper cover, wherein the cap urges the ring to compress an elastic sleeve having an inner surface in contact with a cable received within one of the openings and an outer surface in contact with the upper cover and the lower body, and
wherein a periphery of the lower body and a periphery of the upper cover are each formed of a flat surface arranged to form a contact surface of the lower body and the upper cover when the housing is assembled.

2. The shielded Y-shaped splice connector of claim 1, wherein the contact surface is arranged to ensure the tightness of the housing.

3. The shielded Y-shaped splice connector of claim 1, wherein the openings are formed on the lower body and on the upper cover and the axis of the openings is substantially parallel to the flat surfaces.

4. The shielded Y-shaped splice connector of claim 1, wherein either the lower body or the upper cover comprises alignment elements with the other of the lower body and the upper cover arranged to ensure contact of the surfaces.

5. The shielded Y-shaped splice connector of claim 4, wherein the alignment elements comprise a stud projecting from either the lower body or the upper cover and a hole on the other of the lower body and the upper cover arranged to receive the stud.

6. The shielded Y-shaped splice connector of claim 1, wherein the elastic sleeve is arranged to provide sealing between the cable, the upper cover and the lower body.

7. The shielded Y-shaped splice connector of claim 1, wherein the assembly of the lower body on the upper cover is carried out by tightening elements positioned in an area corresponding to the flat contact surfaces.

8. A method of mounting a shielded Y-shaped splice connector having a housing that includes a lower body, an upper cover, and three openings arranged to receive three cable fixing devices on the housing, wherein a periphery of the lower body and a periphery of the upper cover are each formed of a flat surface arranged to form a contact surface of the lower body and the upper cover when the housing is assembled, the method comprising:
 mounting cable retaining springs in the upper cover,
 visually checking the presence and position of the retaining springs,
 pushing a ring and a cap onto a cable, wherein the cap urges the ring to compress an elastic seal having an inner surface in contact with the cable received within one of the openings and an outer surface in contact with the upper cover and the lower body,
 applying an adhesive to the flat surface of at least one of the lower body and the upper cover,
 visually verifying the presence of at least one of the lower body and the upper cover, and
 assembling the lower body on the upper cover.

9. The method of claim 8, wherein the visual checking step and the visual verifying step are performed via a camera.

10. The method of claim 8, wherein the step of visually checking the presence and position of the retaining springs also includes a check of the condition of the flat surface of the upper cover.

11. The method of claim 8, further comprising positioning a plurality of cables on the lower body.

12. The method of claim 8, wherein all steps of the method are carried out by an automatic device.

13. The method of claim 8, wherein the cable retaining springs are mounted directly into the upper cover.

14. The method of claim 13, wherein the cable retaining springs are stressed by an inner surface of the upper cover.

15. A method of mounting a shielded Y-shaped splice connector having a housing that includes a lower body, an upper cover, and three openings arranged to receive three cable fixing devices on the housing, wherein a periphery of the lower body and a periphery of the upper cover are each formed of a flat surface arranged to form a contact surface of the lower body and the upper cover when the housing is assembled, the method comprising:
 mounting cable retaining springs in the upper cover,
 visually checking the presence and position of the retaining springs,
 pushing a ring and a cap onto a cable, wherein the cap urges the ring to compress an elastic seal
 applying an adhesive to the flat surface of at least one of the lower body and the upper cover,
 visually verifying the presence of at least one of the lower body and the upper cover, and
 assembling the lower body on the upper cover, wherein the upper cover is magnetized to hold the cable retaining springs in place during press closing.

\* \* \* \* \*